(12) United States Patent
Lee

(10) Patent No.: US 8,188,613 B2
(45) Date of Patent: May 29, 2012

(54) INTEGRATED TURBINE GENERATOR/MOTOR AND METHOD

(76) Inventor: S. Peter Lee, Granada Hills, CA (US)

( * ) Notice: Subject to any disclaimer, the term of this patent is extended or adjusted under 35 U.S.C. 154(b) by 428 days.

(21) Appl. No.: 12/460,211

(22) Filed: Jul. 16, 2009

(65) Prior Publication Data
US 2011/0012361 A1 Jan. 20, 2011

(51) Int. Cl.
*F03B 3/04* (2006.01)
(52) U.S. Cl. .......................... 290/54; 290/1 C
(58) Field of Classification Search .......... 290/1 C, 290/52, 43, 44, 54, 55; 415/1, 7
See application file for complete search history.

(56) References Cited

U.S. PATENT DOCUMENTS

| | | | |
|---|---|---|---|
| 4,568,836 A | 2/1986 | Reenberg | |
| 4,622,471 A | 11/1986 | Schroeder | |
| 4,850,190 A * | 7/1989 | Pitts | 60/398 |
| 5,440,176 A | 8/1995 | Haining | |
| 6,091,161 A * | 7/2000 | Dehlsen et al. | 290/43 |
| 6,109,863 A * | 8/2000 | Milliken | 415/1 |
| 6,647,716 B2 | 11/2003 | Boyd | |
| 6,711,897 B2 | 3/2004 | Lee | |
| 6,833,631 B2 | 12/2004 | Van Breems | |
| 6,967,413 B2 | 11/2005 | Atiya | |
| 7,442,002 B2 * | 10/2008 | Mondl | 415/7 |
| 7,541,688 B2 * | 6/2009 | Mackie | 290/54 |
| 7,682,126 B2 * | 3/2010 | Parker | 415/3.1 |
| 7,939,957 B2 * | 5/2011 | Costin | 290/54 |
| 7,948,106 B2 * | 5/2011 | Sugano | 290/54 |
| 7,994,649 B2 * | 8/2011 | Abatemarco | 290/43 |

* cited by examiner

*Primary Examiner* — Nicholas Ponomarenko
(74) *Attorney, Agent, or Firm* — Albert O. Cota

(57) ABSTRACT

An integrated turbine generator/motor (10) which consists of a housing (20) having a cylindrical body (22) and an eyebolt retaining plate (24) attached to the top surface of the cylindrical body (22). A ring gear (26) is rotatably disposed adjacent to the eyebolt retaining plate (24) and a plurality of turbine blades (28) are joined to turbine blade brackets (30) that are attached onto a peripheral edge of the ring gear (26). A plurality of pinion gears (32) rotatably interface with the ring gear (26) and a plurality of planetary gears (50) are connected beneath and are rotated by the pinion gears (32). When the generator/motor (10) functions as a generator (58) it includes a driven shaft (60) with a sun gear (62) attached, with the generator disposed within the housing. The sun gear (62) is rotated by the planetary gears (50) which create electrical energy from the generator by rotation of the ring gear (62). When the generator/motor is used as a motor electrical energy is supplied to the motor which can power a watercraft (94) or a motor vehicle (92).

15 Claims, 5 Drawing Sheets

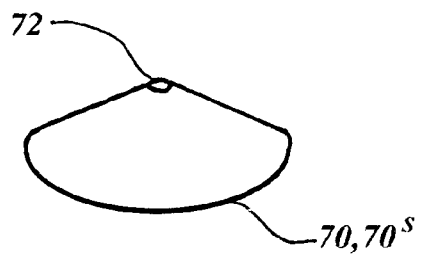
FIG. 5
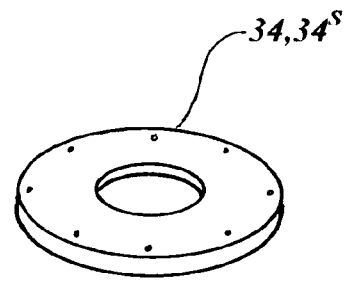
FIG. 6
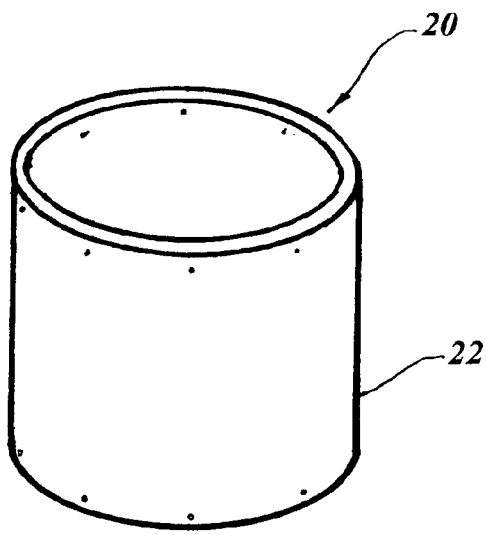
FIG. 7
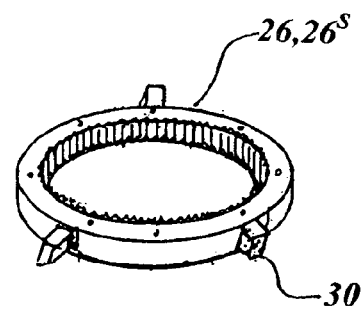
FIG. 8
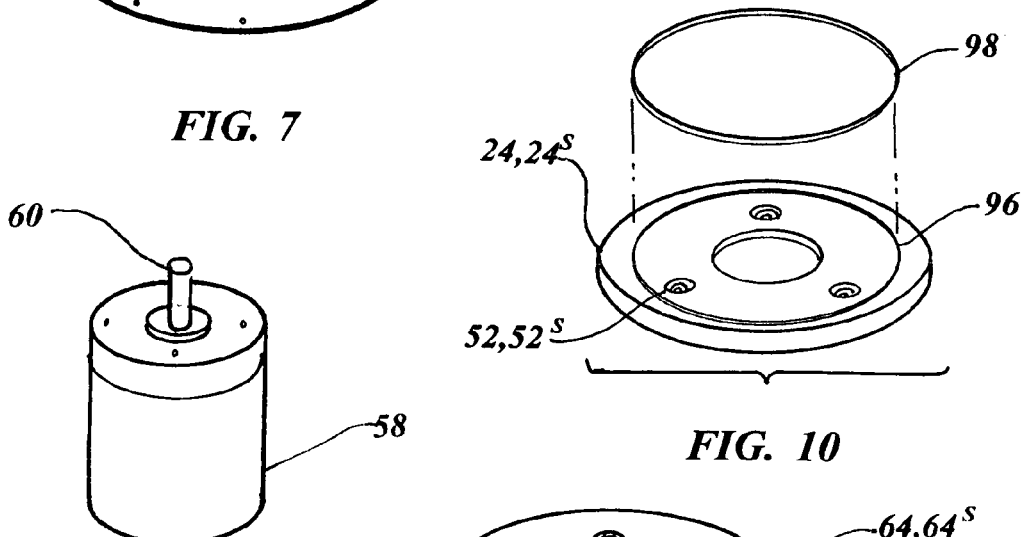
FIG. 9
FIG. 10
FIG. 11

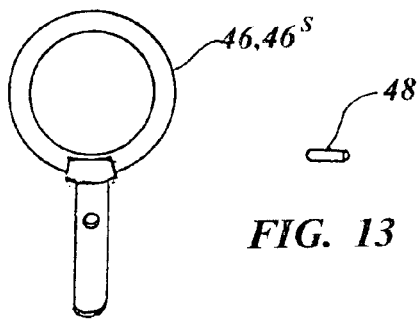
FIG. 12
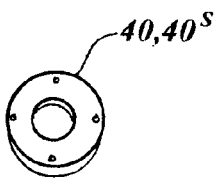
FIG. 13
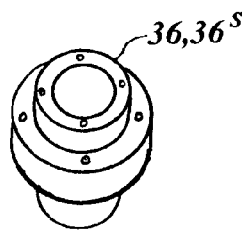
FIG. 14
FIG. 15
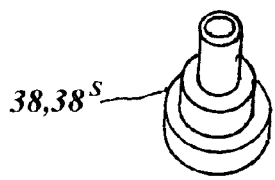
FIG. 16
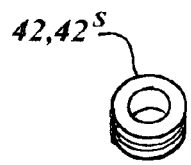
FIG. 17
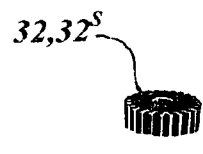
FIG. 18
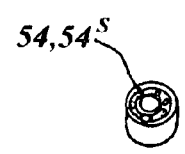
FIG. 19
FIG. 20
FIG. 21
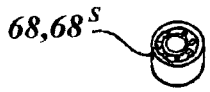
FIG. 22
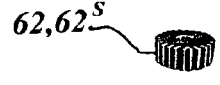
FIG. 23
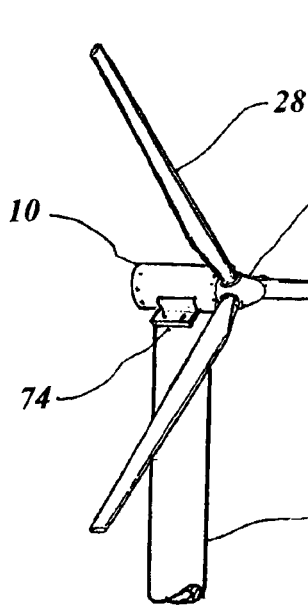
FIG. 24
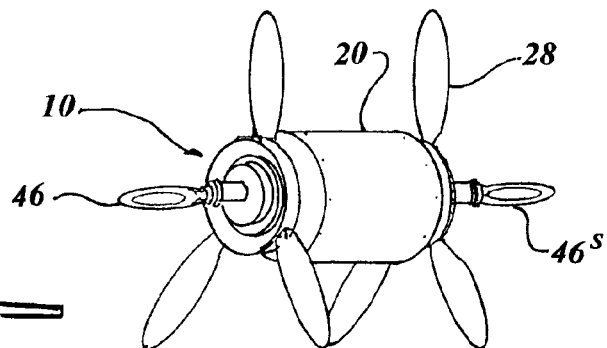
FIG. 25
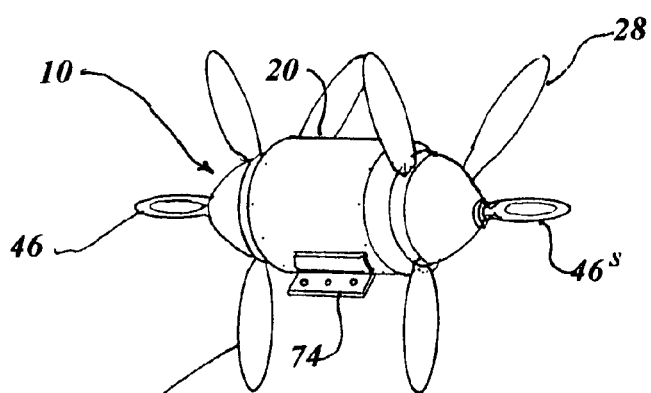
FIG. 26

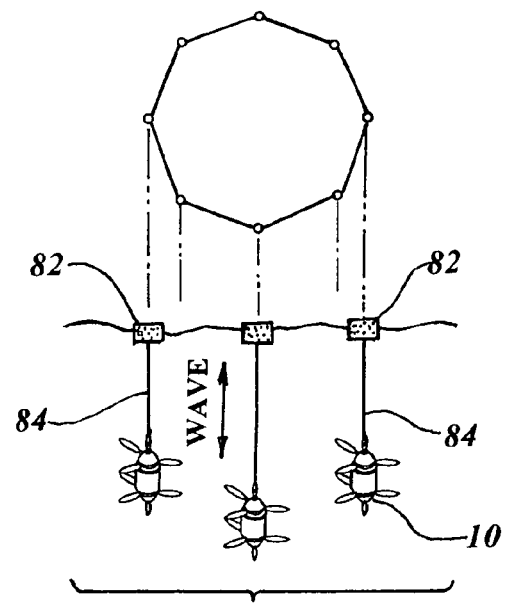
FIG. 27
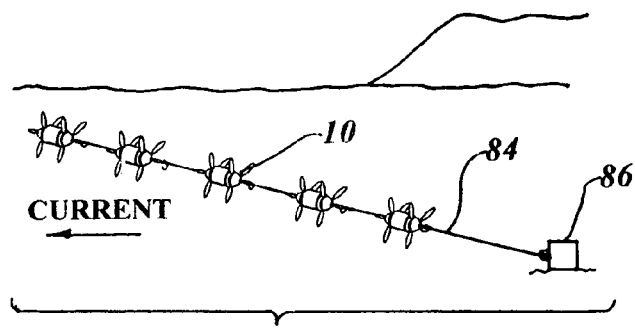
FIG. 28
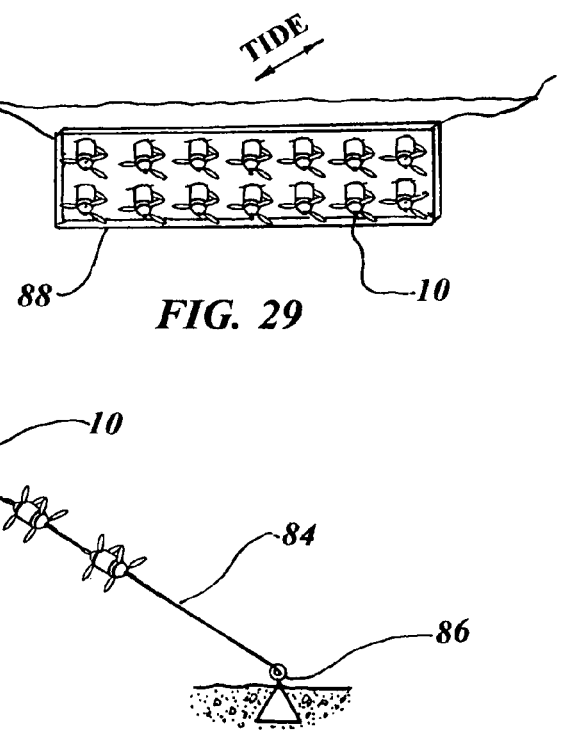
FIG. 29
FIG. 30

INTEGRATED TURBINE GENERATOR/MOTOR AND METHOD

TECHNICAL FIELD

The invention generally pertains to generators and motors and more particularly to an integrated turbine generator/motor that converts mechanical energy into electrical energy or electric energy into mechanical energy in water or in air environments.

BACKGROUND ART

Previously, many types of systems have been used to provide an effective means for generating electrical power from ocean and air environments.

A search of the prior art did not disclose any patents that possess the novelty of the instant invention; however the following U.S. patents are considered related:

| Patent Number | Inventor | Issue Date |
| --- | --- | --- |
| 4,568,836 | Reenberg | Feb. 4, 1986 |
| 4,622,471 | Schroeder | Nov. 11, 1986 |
| 5,440,176 | Haining | Aug. 8, 1995 |
| 6,109,863 | Milliken | Aug. 29, 2000 |
| 6,647,716 B2 | Boyd | Nov. 18, 2003 |
| 6,711,897 B2 | Lee | Mar. 30, 2004 |
| 6,833,631 B2 | Van Breems | Dec. 21, 2004 |

Reenberg in U.S. Pat. No. 4,568,836 teaches an apparatus for converting wave energy to electrical energy in the sea. The apparatus has a floating duck anchored to the sea bottom and a turbine assembly having an air chamber partially filled with liquid and a turbine mounted in an upper portion. The turbine is self-rectifying and a generator is coupled to the turbine. The motion of the waves causes the liquid to compress the air within the chamber which is then used to drive the turbine.

U.S. Pat. No. 4,622,471 issued to Schroeder is for a hydroelectric generator having a plurality of valve intake gate units located upstream of an input penstock. The gate units intercept waves that convert kinetic energy to drive the turbine.

Haining in U.S. Pat. No. 5,440,176 discloses a hydroelectric power plant having combination turbine/generators that are suspended from a submerged tension leg type platform that interfaces with an ocean current. Each turbine/generator is independently positioned to take the best advantage of the current at any given time for generating electricity.

Milliken in U.S. Pat. No. 6,109,863 teaches a submersible apparatus for generating electricity from ocean or stream currents. The submersed apparatus has counter-rotating side by side motors with radial vanes that cause the motors to rotate.

U.S. Pat. No. 6,647,716 B2 issued to Boyd is directed to a power producing network which first pressurizes ocean water into at least one storage chamber having a compressible air pocket and a float linked to a hydraulic ram. The ocean water within the chamber is pressurized and the float releases a stream which engages a turbine to produce electricity.

Lee in U.S. Pat. No. 6,711,897 B2 discloses a floater and a weight which move up and down with the wave motion. The wave motion drives and a flywheel that is connected to a generator U.S. Pat. No. 6,833,631 B2 of Van Breems teaches a wave generator having an elongated inner member that extends vertically into a body of water, with its lower end constrained against a vertical movement beneath the surface of the water. An outer flotation member that produces linear movement is mounted along the length of the inner member. The outer member moves along the inner member, with the length of the outer member extending along the length of the inner member. Movement of the outer member relative to and along the inner member effects relative linear movement between a coil and a magnet to generate electrical power.

For background purposes and as indicative of the art to which the invention is related reference may be made to the remaining cited patent issued to Atiya in U.S. Pat. No. 6,967,413 B2.

DISCLOSURE OF THE INVENTION

There have been prior inventions that are used to generate electrical power in water environments by utilizing the energy formed by the natural flow of water created by gravity, waves, currents and tides. Likewise, wind has been used for the same purpose with considerable success.

The primary object of the invention is to:

A. produce a straight forward apparatus that is integrated to utilize a turbine rotating a generator, and B. an apparatus that can also function as a motor by supplying external power thereby reversing the function to produce a prime mover for vehicles that are located on land or in the water.

An important object of the invention is its simplicity as it consists of only a turbine, a gear box and generator/motor all in one compact unit. The turbine blades are designed to rotate in either water or in air by simply selecting the proper configuration in size, pitch and length. The gear box may either reduce or increase the blade rotation without any basic changes in its design and the generator/motor may operate either as a generator or a motor.

Another object of the invention is that stability is achieved by using counter-rotating rotors where required in some applications when the apparatus is suspended in the water or in air. In rigid mounted functions the secondary gear box and secondary turbine rotor blades are simply omitted and replaced by an end plate and a mounting bracket.

Still another object of the invention is the use of an appropriate generator/motor which preferably consists of a brushless a-c type that utilizes a stator made of non-conductive material and a winding that is wound parallel to the longitudinal axis of the stator. The four basic elements of the apparatus consist of a circular stator, a circular rotor, a bearing and a circular belt such as the applicant's brushless a-c motor disclosed in U.S. patent application Ser. No. 12/002,260, incorporated by reference, which may be used with little or no modification necessary.

Yet another object of the invention is the ease of use for vehicle propulsion as the gear box may be attached directly to a wheel, thereby forming an independent drive system that is easily controlled and highly efficient.

A further object of the invention is in the simplicity of production as only a minimum number of components are required and assembly is straight-forward using techniques well known in the art.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 5 is a partial isometric view of the deflecting cone in the preferred embodiment.

FIG. 6 is a partial isometric view of the ring gear top plate in the preferred embodiment.

FIG. 7 is a partial isometric view of the housing in the preferred embodiment.

FIG. 8 is a partial isometric view of the ring gear with turbine blade brackets in the preferred embodiment.

FIG. 9 is a partial isometric view of the generator/motor in the preferred embodiment.

FIG. 10 is an exploded partial isometric view of the eyebolt retaining plate and the O-ring seal in the preferred embodiment.

FIG. 11 is a partial isometric view of the generator/motor mounting plate in the preferred embodiment.

FIG. 12 is a partial isometric view of the eyebolt in the preferred embodiment.

FIG. 13 is a partial isometric view of the eyebolt pin in the preferred embodiment.

FIG. 14 is a partial isometric view of the bearing cover in the preferred embodiment.

FIG. 15 is a partial isometric view of the bearing hub in the preferred embodiment.

FIG. 16 is a partial isometric view of the housing flange in the preferred embodiment.

FIG. 17 is a partial isometric view of the thrust bearing in the preferred embodiment.

FIG. 18 is a partial isometric view of the pinion gear in the preferred embodiment.

FIG. 19 is a partial isometric view of the upper gear shaft bearing in the preferred embodiment.

FIG. 20 is a partial isometric view of the gear shaft in the preferred embodiment.

FIG. 21 is a partial isometric view of the planetary gear in the preferred embodiment.

FIG. 22 is a partial isometric view of the lower gear shaft bearing in the preferred embodiment.

FIG. 23 is a partial isometric view of the sun gear in the preferred embodiment.

FIG. 24 is a partial isometric view of the wind turbine embodiment.

FIG. 25 is a partial isometric view of the integrated turbine generator/motor apparatus less the deflecting cone.

FIG. 26 is a partial isometric view of a typical mounting bracket on the integrated turbine generator/motor apparatus.

FIG. 27 is a diagram for converting ocean energy into electrical energy from wave movement with the integrated turbine generator/motor apparatus.

FIG. 28 is a diagram for converting ocean energy into electrical energy from ocean current movement with the integrated turbine generator/motor apparatus.

FIG. 29 is a diagram for converting ocean energy into electrical energy from ocean tide movement with the integrated turbine generator/motor apparatus.

FIG. 30 is a diagram for converting wind energy into electrical energy from air movement using a balloon in conjunction with the integrated turbine generator/motor apparatus.

BEST MODE FOR CARRYING OUT THE INVENTION

Figure 2:
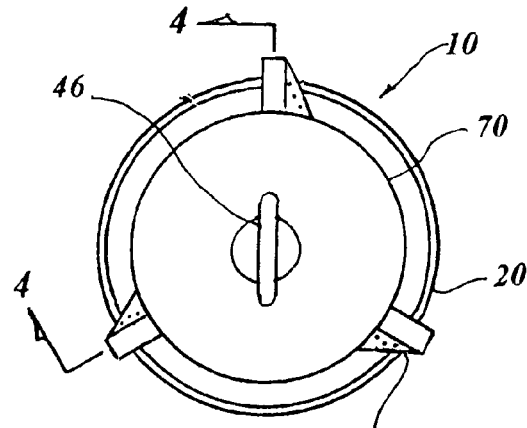
FIG. 2 is a top elevation view of the preferred embodiment.

The best mode for carrying out the invention is presented in terms of a preferred embodiment and a second embodiment for an integrated turbine generator/motor and method. The preferred embodiment 10, as shown in FIGS. 1 through 30, is comprised of a housing 20, which has a cylindrical shaped housing body 22, with an eyebolt retaining plate 24 that is attached to the top surface of the housing body 22. A ring gear 26 is rotatably disposed directly above the eyebolt retaining plate 24. A plurality of turbine blades 28 are each attached to a turbine blade bracket 30 which in turn are attached onto the peripheral edge of the ring gear 26, as shown in FIG. 8.

Figure 3:
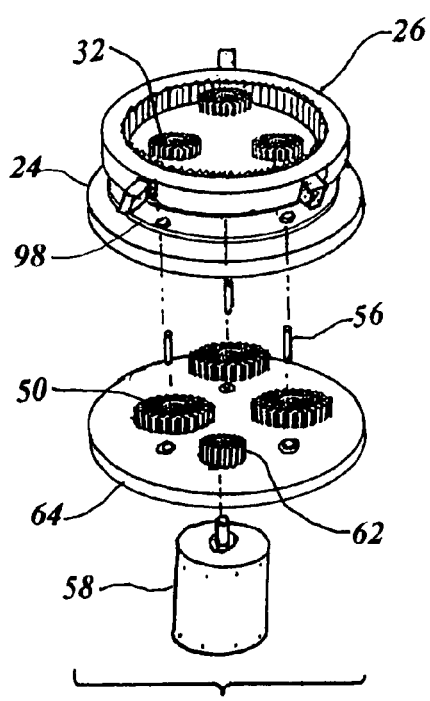
FIG. 3 is an exploded view of the drive train of the preferred embodiment.

A plurality of pinion gears 32, preferably three; rotatably interface with the ring gear 26, as illustrated schematically in FIG. 3. A ring gear top plate 34 is attached to the upper surface of the ring gear 26 and a bearing hub 36 is positioned at the center of the ring gear top plate 34. A housing flange 38 is disposed within the bearing hub 36 and the housing flange 38 is attached to the eyebolt retaining plate 24. The eyebolt retaining plate 24 includes a seal ring groove 96 and an O-ring seal 98 is disposed within the groove 96 for sealing the ring gear 26 from the eyebolt retaining plate 24 as the ring gear 26 rotates.

Figure 4:
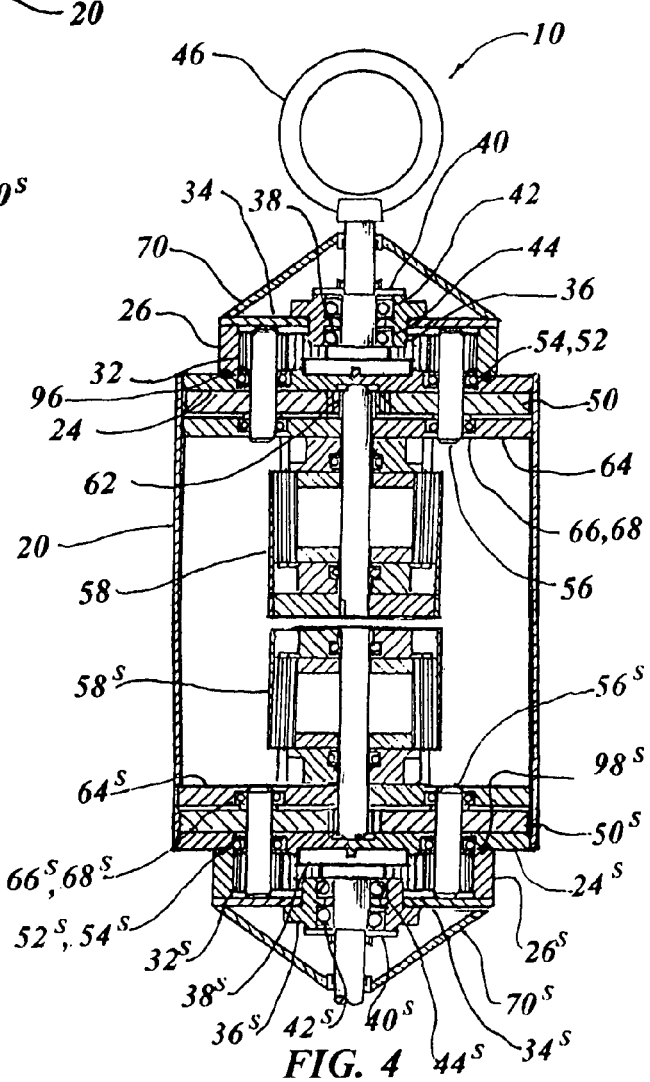
FIG. 4 is a cross-sectional view taken along lines 4-4 of FIG. 2.
Figure 31:
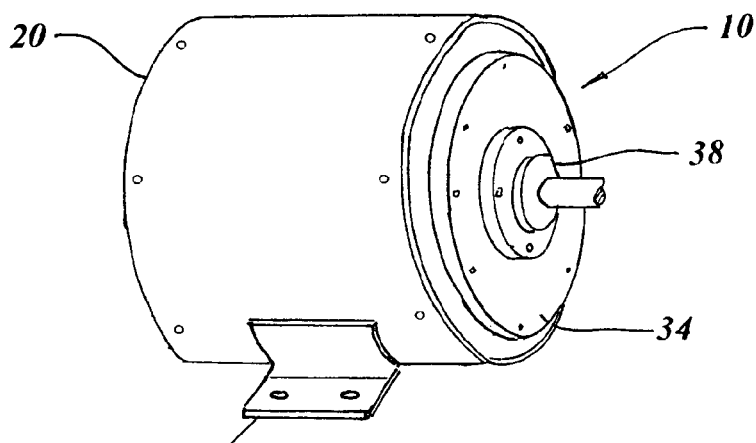
FIG. 31 is a partial isometric view of the integrated turbine generator/motor apparatus.
Figure 32:
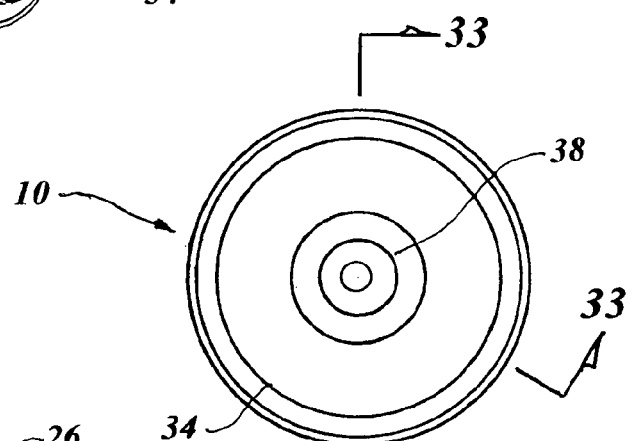
FIG. 32 is a right side elevation view of the second embodiment.
Figure 33:
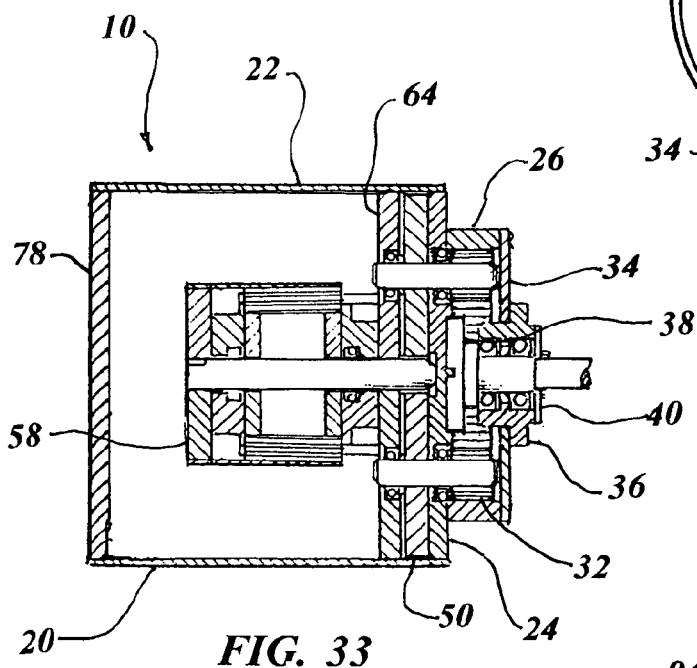
FIG. 33 is a cross-sectional view taken along lines 33-33 of FIG. 32.

A bearing cover 40 is attached to the top surface of the ring gear 26 providing sealing means to isolate the housing flange 38 and ring gear 26. A first thrust bearing 42 has its outer race positioned within the bearing hub 36 on the top surface of the bearing cover 40, and the inner race of the first thrust bearing 42 is pressed onto the housing flange 38. A second thrust bearing 44 has its outer race positioned within the bearing hub 36 and on the bottom surface of the bearing cover 40, with the inner race of the second thrust bearing 44 pressed onto the housing flange 38. An eyebolt 46 is disposed within the housing flange 38 and an eyebolt pin 48 jointly penetrates the eyebolt 46 and the housing flange 38, as illustrated in FIG. 4. Alternately the eyebolt 46 may be attached to the housing flange 38 using threads, not shown but well known in the art.

A planetary gear 50 is connected beneath and rotated by each pinion gear 32, as shown schematically in FIG. 3. The eyebolt retaining plate 24 has a plurality of first bearing holes 52 with a first shaft retaining bearing 54 disposed in each first bearing hole 52. Each first shaft retaining bearing 54 has a gear shaft 56, with the pinion gear 32 attached on the top end of the gear shaft 56 and the planetary gear 50 attached on the bottom end of the gear shaft 56, as illustrated in FIG. 4.

A generator/motor, used in this invention as either a generator 58 or a motor 58 according to its function, includes a driven shaft 60 with a sun gear 62 attached, which is is disposed within the housing 20, depicted in FIG. 4 used as a generator. The sun gear 62 is rotated by the planetary gears 50, thereby creating electrical energy from the generator 58 by rotation of the ring gear 26. A generator mounting plate 64 is attached to the housing body 22 and includes a plurality of second bearing holes 66, with each hole incorporating a second shaft retaining bearing 68 for receiving the lower end of each gear shaft 56.

Figure 1:
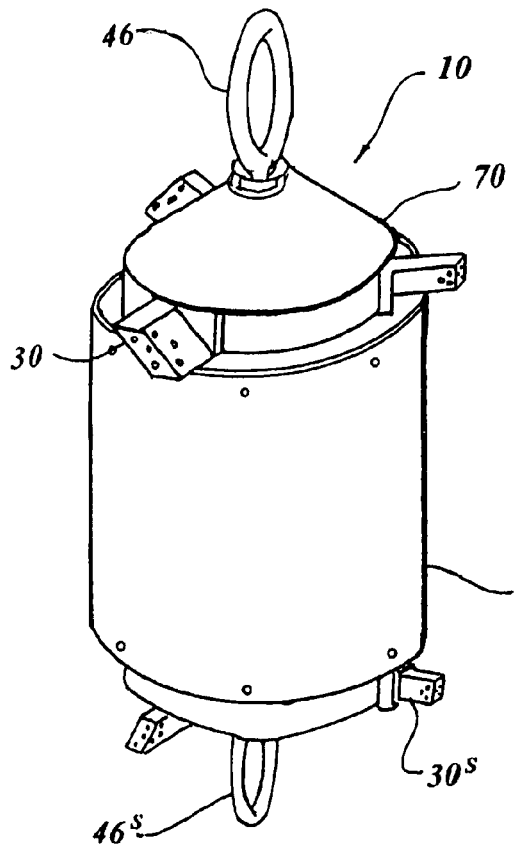
FIG. 1 is a partial isometric view of the integrated turbine generator/motor apparatus in the preferred embodiment.

In the embodiment that is employed in ocean and wind energy applications, a means to provide a stable non-rotating platform is required which is achieved by the use of counter-rotating turbine blades. The blades 28, gears 30, 32 50 and 62 along with the generator 58 duplicate the above elements but incorporate reversing the pitch of the turbine blades 28 along with reversing the angle of the brackets 30. FIGS. 1 and 4 illustrate the counter-rotating turbine blades and consist of the following using the same exact element and designation numbers with the superscript $x^s$ indicating "secondary" as described hereafter.

A secondary eyebolt retaining plate $24^s$ is attached to the bottom surface of the housing body 22 and a secondary ring gear $26^s$ is rotatably disposed adjacent to the secondary eyebolt retaining plate $24^s$. A plurality of opposite pitch secondary turbine blades $28^s$ are joined to opposite angled turbine blade brackets $30^s$ that are attached onto the peripheral edge of the secondary ring gear $26^s$. A plurality of secondary pinion gears $32^s$ rotatably interface with the secondary ring gear $26^s$. Likewise, a plurality of secondary planetary gears $50^s$ are connected above and are rotated by the secondary pinion gears $32^s$ interfacing with a secondary sun gear $62^s$ which drives the secondary generator $58^s$. This configuration permits the secondary turbine blades $28^s$ to counter rotate with the turbine blades $28^s$ creating a stable non-rotating platform when blade rotation is achieved by an external force. Other elements such as $30^s$, $34^s$, $36^s$, $40^s$ through $48^s$ and $52^s$ through $60^s$ are depicted in FIG. 4.

At least one deflecting cone 70, as illustrated in FIGS. 1, 2, 4 and 5, may optionally be attached to the ring gear 26 for specific applications such as wind energy. However, the deflecting cone 70 may be omitted completely when not needed. An opening 72 in the apex of the deflecting cone 70 is configured to clear the eyebolt 46 and housing flange 38, as depicted in FIG. 5.

A mounting bracket 74 may also be affixed to the cylindrical housing body 22 for use in some applications; however the exact configuration may differ in size, shape and location on the housing body 22 and still be within the scope of the claims.

For wind turbine applications the at least one deflecting cone 70 may be replaced with a single nose cone 76 which is attached to the ring gear 26 and an end plate 78 that is attached within the opposite end of the cylindrical housing body 22. The mounting bracket 74 is used in this configuration with the entire assembly mounted on a fixed pedestal 80 as illustrated in FIG. 24.

In use, the method for converting ocean energy into electrical energy with a turbine generator apparatus 10 consists of the following steps:
 a) attaching an eyebolt retaining plate 24 to the top surface of a housing body 22,
 b) positioning a ring gear 26 above the eyebolt retaining plate 24 containing the housing flange 38,
 c) attaching a plurality of turbine blades 28 to a peripheral edge of the ring gear 26,
 d) interfacing a plurality of pinion gears 32 with the ring gear 26,
 e) connecting a plurality of planetary gears 50 beneath the plurality of pinion gears 32,
 f) positioning a generator 58 having a driven shaft 60 with a sun gear 62 attached to the shaft 60 within the housing body 22, with the sun gear 62 rotated by the plurality of planetary gears 50, thereby creating electrical energy from the generator 58 by rotation of the ring gear 26, and
 g) positioning a complete duplicate as above for the secondary counter rotating blade and generator $58^s$, thereby creating a stable non-rotating platform when blade rotation is achieved by an ocean energy external force.

The method for converting ocean energy into electrical energy with a turbine generator employing ocean waves is illustrated in FIG. 27 and consists of attaching a float, such as a floating duck 82, with a cable 84 to one or more counter-rotating blade turbine generators 10. FIG. 28 shows another method of creating electrical energy by employing ocean currents. In the configuration, the cable 84 is attached to a fixed point 86 on one end and to one or more turbine generators 10 on the other end, thus allowing the current to rotate the counter-rotating turbine blades 28. The ocean tide is also utilized for the energy, as depicted in FIG. 29, which incorporates a matrix frame 88 with the turbine generators 10 positioned together attached to a fixed point 86 and mounting brackets 74 on the turbine generator 10.

In use the method of converting wind energy into electrical energy with a turbine generator 10, as illustrated in FIG. 24, consists of the following steps:
 a) attaching an eyebolt retaining plate 24 to a top surface of a housing body 22,
 b) positioning a ring gear 26 above the eyebolt retaining plate 24 with housing flange 38,
 c) attaching a plurality of turbine blades 28 to a peripheral edge of the ring gear 26,
 d) interfacing a plurality of pinion gears 32 with the ring gear 26,
 e) connecting a plurality of planetary gears 50 beneath the plurality of pinion gears 32,
 f) positioning a generator 58 having a driven shaft 60 with a sun gear 62 attached to the shaft 60 within the housing body 22, with the sun gear 62 rotated by the plurality of planetary gears 50, thereby creating electrical energy from the generator 58 by wind rotation of the ring gear 26. This method illustrated in FIG. 24 uses the nose cone 76, the bracket 74, the end plate 78 and a pedestal 80.

An additional method of converting wind energy into electrical energy with a turbine generator 10 is shown in FIG. 30 and consists of the following steps:
 a) attaching an eyebolt retaining plate 24 to the top surface of a housing body 22,
 b) positioning a ring gear 26 above the eyebolt retaining plate 24, with housing flange 38,
 c) attaching a plurality of turbine blades 28 to a peripheral edge of the ring gear 26,
 d) interfacing a plurality of pinion gears 32 with the ring gear 26,
 e) connecting a plurality of planetary gears 50 beneath the plurality of pinion gears 32,
 f) positioning a generator 58 having a driven shaft 60 with a sun gear 62 attached to the shaft 60 within the housing body 22, with the sun gear 62 rotated by the plurality of planetary gears 50, thereby creating electrical energy from the generator 58 by wind rotation of the ring gear 26,
 g) positioning a secondary ring gear $26^s$ below a secondary eyebolt retaining plate $24^s$,
 h) attaching a plurality of secondary turbine blades $28^s$ to a peripheral edge of a secondary ring gear $26^s$,
 i) interfacing a plurality of secondary pinion gears $32^s$ with said secondary ring gear $26^s$,
 j) connecting a plurality of secondary planetary gears $50^s$ above said plurality of secondary pinion gears $32^s$,
 k) engaging a secondary sun gear $62^s$ onto said generator $58^s$ interfacing with said secondary planetary gears $50^s$ which causes said turbine blades 28 and said secondary turbine blades $28^s$ to counter rotate, thereby creating a stable non-rotating platform when blade rotation is achieved by a wind energy external force, l) attaching a cable 84 between a secondary eyebolt 46' and the fixed point 86 on the ground, m) attaching a cable 84 between at least one eyebolt 46 and said at least one secondary eyebolt 46', and n) attaching a cable 84 between said at least one eyebolt 46 and an inflated balloon 90, as shown, or alternatively with a kite or the like.

An integrated motor apparatus having a drive system for a vehicle consists of a housing 20 having a housing body 22 with an eyebolt retaining plate 24 attached to the top surface of the housing body 22. A ring gear 26 is rotatably disposed above the eyebolt retaining plate 24, also having a plurality of pinion gears 32 that rotatably interface with the ring gear 26. A plurality of planetary gears 50 are connected beneath and rotated by the pinion gears 32. The generator/motor is used as a motor 58 which has a drive shaft 60 with a sun gear 62 attached, the motor 58 is disposed within the housing 20. The sun gear 62 rotates the planetary gears 50, thereby creating rotation of the ring gear 26 which is attached to a motor vehicle 92 or a watercraft 94.

A method of converting electrical energy into mechanical energy with an integrated motor apparatus 10 for vehicle propulsion consisting of the following:

a) applying an electrical current to the motor 58, b) rotating a sun gear 62 from the motor 58, c) rotating a plurality of planetary gears 50 with the sun gear 62 from the motor 58, d) rotating a plurality of pinion gears 32 from the planetary gears 50, e) rotating a ring gear 26 from the pinion gears 32, and d) propelling a vehicle by the rotation of the ring gear 26.

Figure 34:
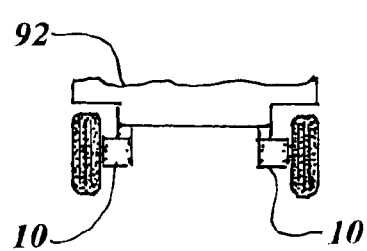
FIG. 34 is a diagram of the integrated turbine motor apparatus driving a pair of motor vehicle wheels.
Figure 35:
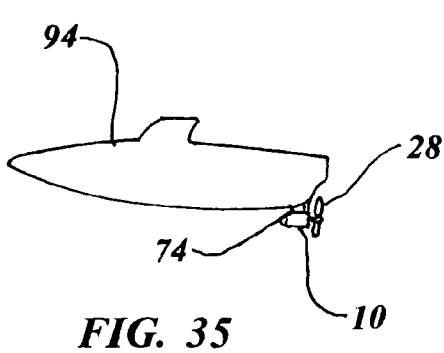
FIG. 35 is a diagram of the integrated turbine motor apparatus propelling a boat or ship.

FIG. 34 illustrates a motor vehicle 92 and FIG. 35 depicts a typical watercraft 94 which may be in the form of a boat or ship, While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

Element Designation

10 turbine generator apparatus
20 housing
22 housing body
24 eyebolt retaining plate
26 ring gear
28 turbine blades
30 turbine blade bracket
32 pinion gears
34 ring gear top plate
36 bearing hub
38 housing flange
40 bearing cover
42 first thrust bearing
44 second thrust bearing
46 eyebolt
48 eyebolt pin
50 planetary gears
52 first bearing holes
54 first shaft retaining bearing
56 gear shaft
58 generator
60 driven shaft (of 58)
62 sun gear
64 generator mounting plate
66 second bearing holes (in 64)
68 second shaft retaining bearing (in 66)
70 deflecting cone
72 opening in cone
74 mounting bracket
76 nose cone
78 end plate
80 pedestal
82 floating duck
84 cable
86 fixed point
88 matrix frame
90 balloon
92 motor vehicle
94 watercraft
96 seal ring groove
98 O-ring seal

The invention claimed is:

1. An integrated turbine generator which comprising:

a) a housing having a cylindrical housing body and an eyebolt retaining plate attached to the housing body top surface, b) a ring gear rotatably disposed adjacent to said eyebolt retaining plate and a plurality of turbine blades joined to a plurality of turbine blade brackets that are attached onto the ring gear peripheral edge, said ring gear also having a plurality of pinion gears that rotatably interface with the ring gear, c) a plurality of planetary gears that are connected beneath and rotated by said plurality of pinion gears, and d) a generator having a driven shaft with a sun gear attached to the driven shaft and the generator disposed within said housing, wherein said sun gear is rotated by said plurality of planetary gears, thereby creating electrical energy from the generator by rotation of said ring gear.

2. The integrated turbine generator as recited in claim 1 further comprising:

a) a ring gear top plate attached to said ring gear, b) a bearing hub positioned at the center of said ring gear top plate, c) a housing flange disposed within said bearing hub and the housing flange attached to said eyebolt retaining plate, d) a bearing cover attached to the top surface of said ring gear, e) a first thrust bearing having an outer race positioned within said bearing hub on the top surface of said bearing cover and a first thrust bearing inner race pressed onto said housing flange, also having a second thrust bearing having an outer race positioned within said bearing hub on the bottom surface of said bearing cover and a second thrust bearing inner race pressed onto said housing flange, and f) an eyebolt disposed within said housing flange and an eyebolt pin jointly penetrating the eyebolt and said housing flange.

3. The integrated turbine generator as recited in claim 2 wherein said eyebolt retaining plate further having a plurality of first bearing holes and a first shaft retaining bearing disposed in each first bearing hole and each first shaft retaining bearing having a gear shaft with said pinion gear attached on the gear shaft top end and the planetary gear attached on a gear shaft bottom end.

4. The integrated turbine generator as recited in claim 3 further comprising a generator mounting plate attached to said housing, said generator mounting plate further having a plurality of second bearing holes and a second shaft retaining bearing disposed in each second bearing hole for receiving each gear shaft.

5. The integrated turbine generator as recited in claim 1 wherein said ring gear having a plurality of counter-rotating turbine blades which comprises,
   a) a secondary eyebolt retaining plate attached to the bottom surface of said housing body,
   b) a secondary ring gear rotatably disposed adjacent to said secondary eyebolt retaining plate and a plurality of secondary turbine blades joined to a plurality of turbine blade brackets that are attached onto a peripheral edge of the secondary ring gear, secondary ring gear further having a plurality of secondary pinion gears that rotatably interface with the secondary ring gear, and
   c) a plurality of secondary planetary gears connected above and rotated by said plurality of secondary pinion gears interfacing with a secondary generator having a secondary sun gear causing said turbine blades and secondary turbine blades to counter rotate, thereby creating a stable non-rotating platform when blade rotation is achieved by an external force.

6. The integrated turbine generator as recited in claim 1 further comprising a deflecting cone attached to said ring gear, wherein said deflecting cone having an opening in the apex configured to clear said eyebolt and said housing flange.

7. The integrated turbine generator as recited in claim 1 further comprising a mounting bracket affixed to said cylindrical housing body.

8. The integrated turbine generator as recited in claim 7 further comprising a nose cone attached to said ring gear, wherein the nose cone also has an end plate attached within the bottom end of said cylindrical housing body wherein the nose cone, end plate, mounting bracket and a fixed pedestal form a wind turbine.

9. A method of converting ocean energy into electrical energy with a turbine generator which comprises the steps of:
   a) attaching an eyebolt retaining plate to the top surface of a housing body,
   b) positioning a ring gear above the eyebolt retaining plate,
   c) attaching a plurality of turbine blades to a peripheral edge of said ring gear,
   d) interfacing a plurality of pinion gears with said ring gear,
   e) connecting a plurality of planetary gears beneath said plurality of pinion gears,
   f) positioning a generator having a driven shaft with a sun gear attached to the shaft within the housing body, with the sun gear rotated by the plurality of planetary gears, thereby creating electrical energy from the generator by rotation of the ring gear,
   g) attaching a secondary eyebolt retaining plate to the top surface of the housing body,
   h) positioning a secondary ring gear below a secondary eyebolt retaining plate,
   i) attaching a plurality of secondary turbine blades on said secondary ring gear peripheral edge,
   j) interfacing a plurality of secondary pinion gears with the secondary ring gear,
   k) connecting a plurality of secondary planetary gears above the plurality of secondary pinion gears,
   l) positioning a secondary generator having a secondary driven shaft with a secondary sun gear attached to the secondary shaft within the housing body, with the secondary sun gear rotated by the plurality of secondary planetary gears, thereby creating electrical energy from the secondary generator by rotation of the secondary ring gear, also producing a stable non-rotating platform when blade rotation is achieved by an ocean energy external force.

10. The method of converting ocean energy into electrical energy with a turbine generator as recited in claim 9 wherein said ocean energy is an ocean current.

11. The method of converting ocean energy into electrical energy with a turbine generator as recited in claim 9 wherein said ocean energy is an ocean wave.

12. The method of converting ocean energy into electrical energy with a turbine generator as recited in claim 9 wherein said ocean energy is an ocean tide.

13. A method of converting wind energy into electrical energy with a turbine generator which comprises the steps of:
   a) attaching an eyebolt retaining plate to the top surface of a housing body,
   b) positioning a ring gear above the eyebolt retaining plate, with the ring gear having a nose cone,
   c) attaching a plurality of air turbine blades to a peripheral edge of said ring gear,
   d) interfacing a plurality of pinion gears with said ring gear,
   e) connecting a plurality of planetary gears beneath the plurality of pinion gears, and
   f) positioning a generator having a driven shaft with a sun gear attached to the shaft, with the sun gear rotated by the plurality of planetary gears, thereby creating electrical energy from the generator by wind rotation of the ring gear.

14. The method of converting wind energy into electrical energy with a turbine generator as recited in claim 13 wherein said housing body is attached to a fixed pedestal.

15. The method of converting wind energy into electrical energy with a turbine generator as recited in claim 13 further comprising the additional steps of:
   g) positioning a secondary ring gear above a secondary eyebolt retaining plate,
   h) attaching a plurality of secondary turbine blades to a peripheral edge of a secondary ring gear,
   i) interfacing a plurality of secondary pinion gears with said secondary ring gear,
   j) connecting a plurality of secondary planetary gears above said plurality of secondary pinion gears,
   k) engaging a second generator with a sun gear to said secondary planetary gears which causes said turbine blades and said secondary turbine blades to counter rotate, thereby creating a stable non-rotating platform when blade rotation is achieved by a wind energy external force,
   l) attaching a cable between a secondary eyebolt and a fixed point on the ground,
   m) attaching a cable between at least one eyebolt and said at lest one secondary eyebolt, and
   n) attaching a cable between said at least one eyebolt and an inflated balloon.

* * * * *